Aug. 21, 1962 G. MUFFLY 3,049,892
DEFROSTING OF EVAPORATOR
Original Filed Aug. 9, 1950 6 Sheets-Sheet 1

INVENTOR.

Aug. 21, 1962     G. MUFFLY     3,049,892
DEFROSTING OF EVAPORATOR
Original Filed Aug. 9, 1950     6 Sheets-Sheet 2

INVENTOR.

INVENTOR.

3,049,892
DEFROSTING OF EVAPORATOR
Glenn Muffly, 1541 Crestview Drive, Springfield, Ohio
Application Dec. 12, 1955, Ser. No. 552,530, now Patent No. 2,942,432, dated June 28, 1960, which is a division of application Ser. No. 178,498, Aug. 9, 1950, now Patent No. 2,765,633, dated Oct. 9, 1956. Divided and this application Nov. 3, 1959, Ser. No. 850,984
5 Claims. (Cl. 62—210)

This application is a division of my copending application, Serial No. 552,530, filed December 12, 1955, now Patent No. 2,942,432, issued June 28, 1960, which is a division of my application, Serial No. 178,498, filed August 9, 1950, now Patent No. 2,765,633, issued October 9, 1956.

This invention pertains to household refrigerators of automatic type incorporating an automatic ice maker of the flotation type. This specification covers various improvements over disclosures of my several issued patents and pending patent applications of which the earliest is U.S. Patent No. 2,145,773, issued January 31, 1939. In this and several other patent applications of mine, I disclosed an automatic ice maker of the flotation type employing a removable tank in which ice was made and stored along with drinking water. In later applications of mine, particularly Serial No. 771,181, filed August 29, 1947, now Patent No. 2,641,109, issued June 9, 1953, and Serial No. 74,528, filed February 4, 1949, now Patent No. 2,709,343, issued May 31, 1955, I disclosed household refrigerators having the ice maker tank built in or combined with the liner of the main food space.

While these patent applications represented improvements in certain respects over my earlier applications showing the removable tank, problems were encountered in planning production because of the difficulty of welding or otherwise making permanently tight seams between two pieces of metal of which one or both is to be coated with vitreous enamel. Also this plan of combining the ice maker tank with the cabinet liner precludes ready removal for cleaning or access for scrubbing out the tank while in place.

A problem which presented itself was that of providing suitable agitation of the water in the ice maker tank to make clear ice, particularly with reference to sealing the shaft of a motor used for this purpose or providing a magnetic drive to the water agitating device, and locating the agitating motor so that the heat generated thereby would not adversely affect the performance of the refrigerator.

Another difficulty was that many users prefer the main food compartment of a refrigerator to be maintained at a slightly lower humidity than is obtained with 32° F. cooling surfaces. Users also object to the wet walls of the food compartment caused by using the liner of the compartment as the cooling surface.

A prime object of this invention is to overcome the above listed shortcomings of previous designs.

Another object is to utilize the previously objectionable heat of the motor employed to agitate the water, applying this heat to a special compartment for storage of certain foods such as butter, cheese and other dairy products, in which it is desired to maintain a higher temperature than in the main food space of the cabinet.

A further object is to maintain a higher water level in the drinking water tank than in the overflow tank where water level is maintained by means of a float valve.

A further object is to provide for refilling the drinking water tank each time the ice maker starts operation.

Another object is to provide a trap for the collection of minerals frozen out of the water so that such mineral deposit may easily be drained or washed out.

An additional object is to produce an automatic ice maker of relatively small height in proportion to its horizontal dimensions so that it can be located adjacent the top wall of the food compartment of a refrigerator without interfering with visibility of and access to the main food compartment below it or made into a counter type assembly of low height.

Another object is to provide for returning to the circulating system any water of meltage which collects at a level below the ice storage compartment.

An additional object is to provide an ice maker assembly adapted to be mounted in contact with the top of the liner of a refrigerator cabinet so that the liner provides a cover for the ice maker, the ice storage compartment and the drinking water tank.

A further object is to provide an ice maker assembly having all its working parts readily accessible for servicing.

Another object is to fit the ice maker into cabinets such as are used in present automatic refrigerators with a minimum retooling cost.

A further object is to provide for draining defrost water and dew from a cooling element located in the top of the food space to a drip evaporator located below the main food space without the use of a drain tube through the food space.

Another object is to allow the water level in the ice maker to drop below its operating level during idle periods so that when the ice is released it first drops into the water, where it aids in keeping the water cool, and then at the start of the next ice-making cycle when the water level rises the previously released batch of ice is immediately floated from the tank to its storage compartment where the ice is stored out of the path of water flow.

Another object is to provide for collecting any leakage around the pump shaft and conveying such water of leakage to the drip evaporator which disposes of defrost and condensate water.

An additional object is to provide a bottom-hinged front door for the ice storage compartment provided with wings which extend downwardly into the water overflow tank when the door is closed and extend upwardly when the door is opened to provide a convenient chute for the removal of ice without danger of ice blocking the door to prevent its reclosure.

A further object is to provide a water faucet of self-closing type which occupies the minimum amount of space and is yet readily accessible for filling vessels without interfering with the arrangement of foods within the refrigerator.

Another object is to provide a location for water softening cartridges which may be used when required in localities where the water supply is hard, these cartridges being arranged to receive water from the overflow of the drinking water tank.

Another object is to combine the ice maker, the ice storage compartment, the drinking water tank and the warm storage compartment in a unit assembly which can be operated separately from the refrigerator cabinet.

A further object is to provide such an assembly which may be fabricated from two or more kinds of metal, as for instance, stainless steel comprising the wall on which ice making areas are located and aluminum for the main other parts of the assembly.

A still further object is to provide a refrigerator having a frozen food compartment and a separate non-freezing compartment, each with its own evaporator, with means for defrosting of the freezer evaporator without heating the evaporator of the warmer compartment.

Figure 1:
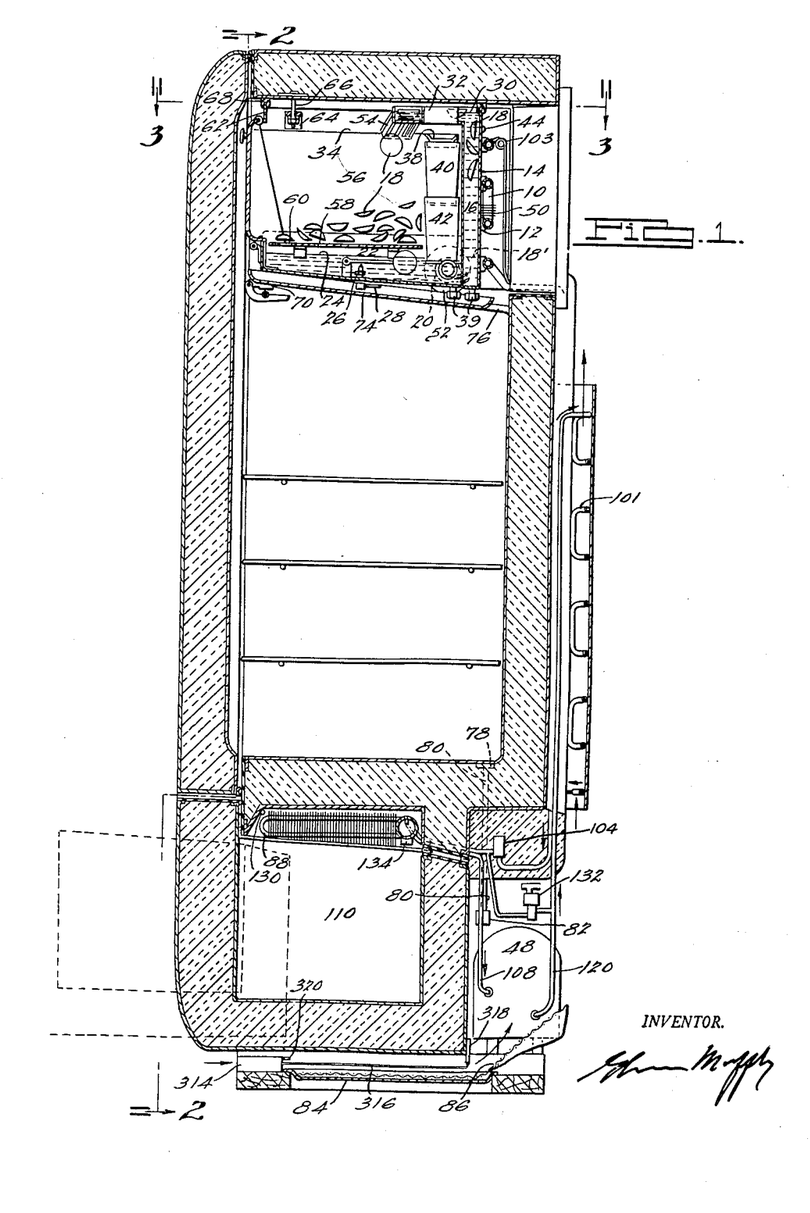
FIG. 1 is a sectional view of a household refrigerator incorporating the features of this invention.

Referring to FIG. 1, the ice maker is seen in section and will be recognized as operating upon the same principle as other flotation-type ice makers disclosed in my several issued U.S. patents and pending patent applications. The evaporator coil 10 is soldered or otherwise secured to a number of metal buttons 12 preferably made of copper or other metal having a high thermal conductivity. These buttons occur at intervals along the length of the evaporator tube and are soldered or otherwise secured to the vertical wall 14 which forms one side of the ice maker tank 16. During operation of this ice maker water is circulated upwardly within the tank 16 while the tube 10 is refrigerated causing discs or hemispherical pieces of ice 18 to form on the inside of the wall 14 which is preferably made from thin stainless steel.

The pump 20 draws water from the overflow tank 22 wherein water is maintained at the level 24 by means of the float valve 26 and the supply line 28. The pump 20 delivers water into the bottom of the tank 16 at sufficient volume and pressure to cause the water within the tank 16 to rise to the level 30, thus maintaining a considerable flow of water through the overflow trough 32. The bulk of this overflow water falls into the removable tank 34 though some of it may be carried with the ice and drain to tank 22. It is thus seen that soon after the system is started the removable tank 34 will be filled with water to the level 36. When the water level rises to the bottom of the overflow spout 38 water overflows at a rate equivalent to that at which water falls into the tank 34. One or more drains 39 allow withdrawal of impurities which collect in the bottoms of tanks 16 and 22.

Overflow water from the tank 34 falls into the water treating cartridge 40 from which any overflow falls directly into the overflow tank 22. Water flows through the cartridge 40 into the cartridge 42 and thence into the overflow tank 22. Thus most of the water reaches the overflow tank by way of the water treating cartridges, as shown in my co-pending application Serial No. 109,942, filed August 12, 1949, now Patent No. 2,672,017, issued March 16, 1954.

During this circulation of water a portion thereof is frozen within the tank 16 to form the several pieces of ice 18. When one of these pieces of ice has grown to a size such as to affect the control bulb 44 the refrigeration of evaporator 10 is automatically stopped in accordance with the practice taught in my earlier patents. While the method of control is the same, the result of stopping at the desired ice size is different in that the opening of the switch 46 which stops the motor-compressor unit 48 and the pump 20 results in draining the ice maker tank 16 into the overflow tank 22, establishing therein a new water level only slightly higher than the operating water level 24. Since the evaporator 10 not only cools the ice making surface but cools air from the main food space which is free to circulate thereover and may be provided with fins 50 to enhance this action, it will be seen that the evaporator tube 10 will warm up upon stopping of the system thus causing the pieces of ice 18 to melt free from the wall 14, but instead of immediately floating upwardly as in my previously disclosed ice makers the upper pieces of ice will fall into the water remaining in the bottom of the ice maker tank 16 and remain there until the pump 20 is restarted.

The control which restarts the motor-compressor unit and the pump may be as disclosed in one of my issued patents or pending applications, preferably as shown in my U.S. patent application, Serial No. 50,101, filed September 20, 1948, now Patent No. 2,672,016, issued March 16, 1954, with a delayed start of one of the motors, though this delayed start is not so important in a household refrigerator as in the commercial type of ice maker shown in that patent application. In the present case it may be preferred to arrange the thermostatic switch 46 to start the pump motor 52 with a relay switch 53 for delayed start for the motor-compressor unit, thus insuring that the water level in the tank 16 will rise carrying with it the previously released ice before the evaporator 10 is cooled to a temperature which might cause a loose piece of ice to adhere to the wall 14 instead of floating out of the tank as desired.

As the water level rises in the tank 16 and water overflows therefrom to the tank 34 floating pieces of ice are carried out through the overflow trough 32 and slide down the chute 54 to fall into the storage compartment 56 where such ice is supported on the shelf 58. This shelf may be perforated but in any event it fits loosely so that water of meltage from the stored ice falls into the overflow tank 22. It is preferred that at least one hole 60 be provided in the shelf 58 to facilitate its removal to provide access to the float valve 26.

The housing 62 of the ice maker assembly is provided internally with two angle lugs 64 which support it on the studs 66 attached to the top of the refrigerator. It is preferred that the top edge of this housing be fitted with a rubber gasket 68 for the purpose of sealing it against the top of the liner when the nuts on studs 66 are tightened. This eliminates the necessity for providing a separate top for the housing 62.

The water tank 34 is a separate assembly readily removable by sliding forward, carrying with it the self-closing valve 70 and its trim plate 72 which closes the necessary gap in the front edge of the drip pan 74. This drip pan is also removable but need not be removed in ordinary service operations. It will be noted that the pan 74 is so formed that water drains to its rear left corner and thence out over the lip 76 which directs the water against the liner of the cabinet at its left rear corner. It is preferred to allow this water to run down the corner of the liner rather than through any tube located inside of the food space or within the insulation as such tubes are notably collectors of dirt and germs. The drip water running down the corner of the liner is directed into the drain 78 pressed into the bottom of the liner and flows through the tube 80 which is straight and easily cleanable to the removable trap 82 and thence to the drip evaporating pan 84 from which it is evaporated with the aid of fabric 86 to room air as described in connection with my aforementioned patent application, Serial No. 74,528. This patent application also discloses the drawer-type freezer and mechanism for defrosting its evaporator 20 which is equivalent to the evaporator 88 seen in FIG. 1 of the present application. My aforementioned application, Serial No. 74,528 also shows the FIG. 2 thereof a refrigerant circuit and control device providing hot-gas defrosting of the freezer evaporator. The same system can be used in connection with the present invention, or I can use the one shown by FIG. 4 hereof, which provides for defrosting of the freezer evaporator while the ice-maker evaporator is active.

Figure 4:
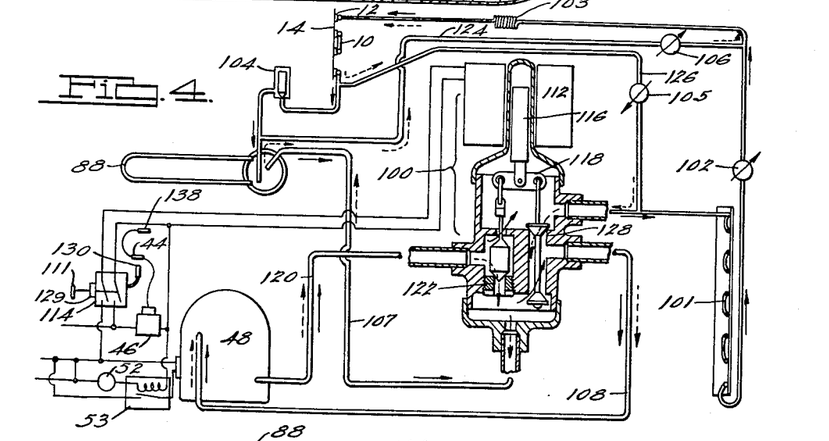
FIG. 4 is a diagrammatic illustration of a refrigerating system suitable for use in connection with FIGS. 1, 2 and 3 and illustrating an arrangement of valves which provide for hot-gas defrosting of the freezer evaporator.

In FIG. 4 the valve assembly 100 is similar to the assembly 100 of my co-pending U.S. patent application, Serial No. 45,343, filed August 20, 1948, now Patent No. 2,654,227, issued October 6, 1953, but is here connected for switching the condenser function from the condenser 101 to the freezer evaporator 88 while allowing the condenser to stand idle and the ice-maker evaporator 10 to continue operating. This provides more rapid defrosting of the freezer evaporator than is obtained by the usual "hot-gas" method which connects the compressor discharge directly to the evaporator to be defrosted and leaves the outlet of the evaporator connected with the suction port of the compressor. Such defrosting is inefficient in that no useful work other than defrosting is performed by the compressor and this job is poorly done because the discharge pressure of the compressor drops. I prefer the method shown by FIG. 4 because it utilizes the condensing function of the freezer evaporator being defrosted to deliver liquid refrigerant to the ice-maker evaporator so that both sides of the refrigerating system are being used. Heat given up to the freezer evaporator in defrosting it allows condensation of refrigerant and the evaporation of this refrigerant does useful work in cooling the ice-maker evaporator 10.

In FIG. 4 the solid arrows indicate the flow of refrigerant during normal operation of both the ice-maker evaporator and the freezer evaporator. It will be noted that liquid refrigerant flows from the condenser 101 through the check valve 102 to the restrictor 103 and the ice-maker evaporator 10 from which it must flow through the weighted check valve 104 since the check valve 105 is held closed by the high discharge pressure on its opposite side. After passing the weighted pressure reducing check valve 104 the refrigerant is at a still lower pressure and again it cannot pass through the check valve 106 because of the higher pressure on its opposite side, hence it flows through the freezer evaporator 88 where evaporation is substantially completed and the vapor flows through the tube 107 to the valve assembly 100 and thence back to the suction side of the compressor 48 through the tube 108. This operation continues under control of the thermostatic switch 46, stopping and starting ice-making and ice-releasing cycles with an idle defrosting of the ice-maker evaporator 10 during each ice-releasing period.

The freezer evaporator 88 does not defrost during normal idle periods of the system because it is enclosed in a much colder zone and not subject to any direct heat input. Normally the drawer 110 is open for such short periods that this does not cause evaporator 88 to defrost, but it is only during periods when drawer 110 is open that evaporator 88 can be defrosted by pulling out knob 111, since this knob is so located that closing of drawer 110 pushes it in to deenergize solenoid 112.

When the user opens the freezer drawer 110 and pulls out the knob 111 to defrost the freezer evaporator, as is more fully explained in my co-pending patent application, Serial No. 74,528 above mentioned, current is supplied to the solenoid 112 through the switch 114 causing the armature 116 to lift, carrying with it the four valves attached to it, by means of its stem and the rocker arm 118. Since switch 114 energizes switch 53 to start motor-compressor unit 48 high pressure vapor discharged from the compressor through the tube 120 now flows through the now open port 122 of the valve mechanism as indicated by broken arrow and the tube 107 to the freezer evaporator 88 where it is quickly condensed by the very low temperature of this evaporator while rapidly warming the evaporator to its defrost temperature. Liquid refrigerant collecting in the evaporator 88 cannot flow through the weighted valve 104 which now acts as a check valve but does flow through the tube 124 and the check valve 106 to the inlet of the vapor lock resistrictor 103 from which it flows at reduced pressure into the ice-maker evaporator 10. Leaving the ice-maker evaporator largely in vapor phase the refrigerant cannot flow through the restrictor valve 104 because it is being held closed by high side pressure as well as by the weight of the valve, hence vapor leaving the ice-maker evaporator must flow through the tube 126 and the check valve 105 to the valve assembly 100 where it passes through the now open port 128 to the suction tube 108 leading back to the motor-compressor unit 48.

This operation continues until switch 114 is reopened by a timing device 129 as described in my aforementioned copending application, Serial No. 74,528, by thermostatic means associated with the evaporator 88 or manually, as occurs when knob 111 is pushed in either by hand or by the closing of drawer 110. In the co-pending application last mentioned the timing device stops the defrosting and at the same time releases the drawer to let it close by gravity due to its inclined roller slide. It will be obvious that switch 114 may if desired be opened thermostatically by means of connection with the bulb 130 located adjacent evaporator 88 and this will allow the drawer to reclose as in the co-pending case last mentioned above.

When switch 114 is reopened in any manner the effect is to deenergize solenoid 112 and return the system to normal operation of both evaporators as first described.

Should it be desired to employ the more conventional "hot-gas defrost" method at the sacrifice of efficiency to obtain a lower cost the single solenoid valve 132 may be connected as shown in FIG. 1 to allow high pressure vapor to flow from tube 120 to evaporator 88, by-passing 103, 10 and 104. This valve 132 may be controlled by the same switch 114 with manual, thermostatic or clock-actuated reclosing as above described.

Figure 5:
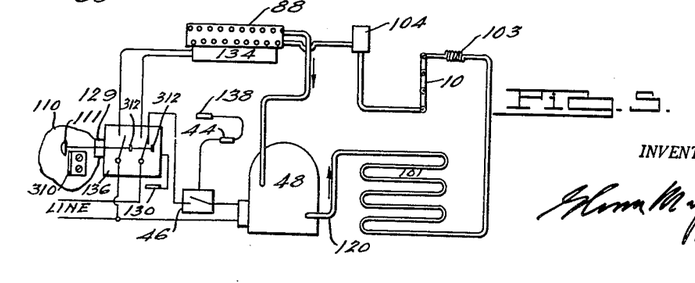
FIG. 5 is a diagrammatic illustration of a modified electrical circuit for defrosting the freezer evaporator.

An alternative method of defrosting the evaporator 88 is to mount an electric heater 134 as shown in FIG. 1 and connect it with the electrical power source by means of a switch 136, which is similar to 114 but with contacts alternately closed instead of being closed at the same time. Such a switch is shown in FIG. 5 with the required connecting wires. When this switch is actuated by pulling out the knob 111 the effect is to break the circuit leading to motor-compressor unit 48 and close the circuit leading to heater 134. This insures stopping of the compressor while the evaporator 88 is electrically heated. This heat is distriubuted to all refrigerant passages of evaporator 88 by converting the evaporator temporarily into a secondary refrigerating system with evaporation adjacent the heater and condensation occurring in all other parts of the evaporator.

Since evaporator 88 is normally the coldest part of the system it will have a considerable amount of liquid refrigerant in it at the start of defrosting. Refrigerant cannot flow from it back to evaporator 10 because of valve 104. Flow of vapor to unit 48 is retarded until evaporator 88 approaches the temperature of unit 48, at which time its defrosting will have been completed.

Figure 3:
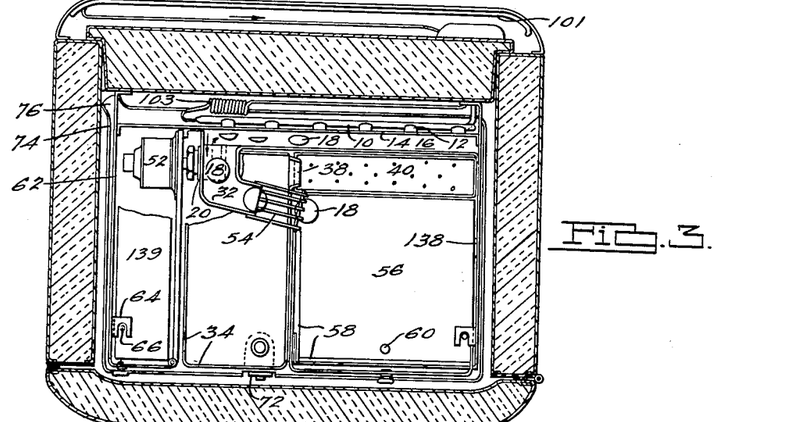
FIG. 3 is a horizontal section of FIGS. 1 and 2 taken on the lines 3—3 thereof.
Figure 6:
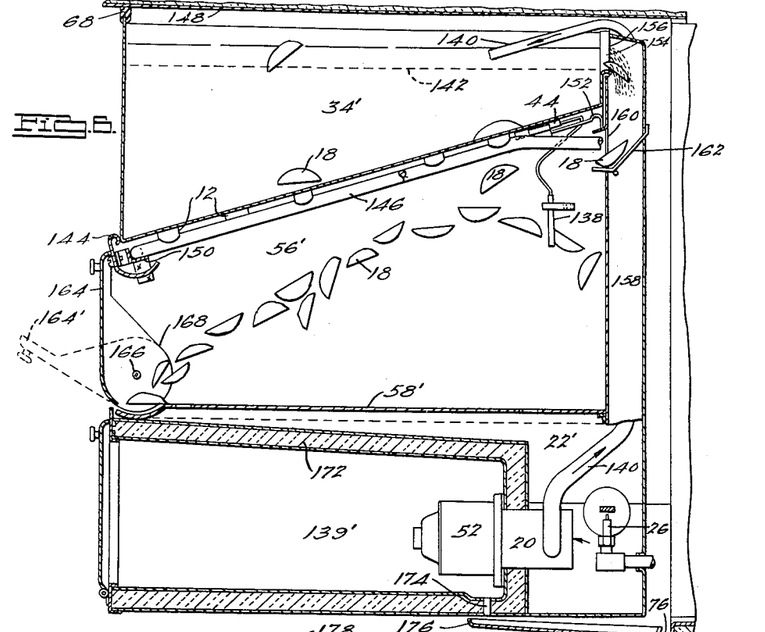
FIG. 6 is a side elevation in section of a modified arrangement incorporating the features of FIGS. 1, 2 and 3.
Figure 7:
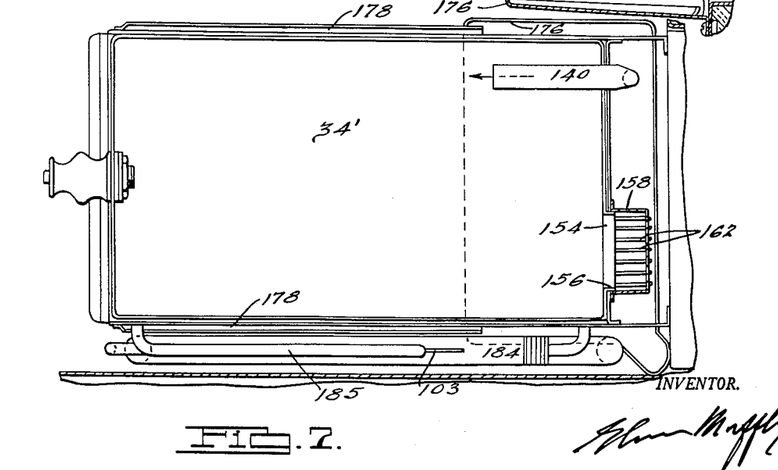
FIG. 7 is a plan view of FIG. 6.

The switch 46 is supplied with two bulbs 44 and 138, the latter bulb being located adjustably as to height as seen in FIG. 3 or 6 where it responds to accumulation of ice in chamber 56 or 56' up to its level. This bulb is also seen in FIG. 4 and for the purpose of illustration is shown as being of larger diameter than the tube which connects the bulb with switch 46, but it will be understood that both bulb 44 and bulb 138 may be merely sections of the one tube provided that the volatile charge used in switch 46 is such that all of the liquid fraction of this volatile charge may be contained in either bulb 44 or bulb 138. In normal operation before the maximum supply of ice has been accumulated in chamber 56 bulb 44 drops to a lower temperature than bulb 138 when the piece of ice forming nearest it has grown to its desired maximum size at which time bulb 44 causes switch 46 to open, stopping the formation of ice. Bulb 44 cannot rise to the cut-in temperature of switch 46 until the piece of ice nearest it has melted free from the surface on which it formed and floated or dropped away. It is preferred that bulb 44 be located adjacent the ice-making area which is slowest in warming up and therefore the last to release its piece of ice, thus insuring that a new ice-making period will not begin util after all of the ice has been released. When ice accumulates in chamber 56 up to the level at which bulb 138 is contacted by ice, bulb 138 becomes colder than bulb 44 and the entire liquified fraction of the volatile charge of switch 46 will be contained within bulb 138 thus preventing switch 46 from reclosing to start another ice-making period.

If desired the freezer 110 may be provided with a separate control as disclosed in other patent applications of mine, but this is not necessary if the design is such that ice-making periods occur frequently enough to insure satisfactory cooling of the evaporator 88 and freezer space 110 under all normal conditions.

In FIG. 6 the ice storage space 56' is located below the drinking water tank 34' instead of beside it as 56 in FIGS. 1, 2, and 3. The butter compartment 139' is located below the ice storage compartment instead of beside it as 139 is in FIG. 3 and the inclined bottom of the water tank provides the ice-making areas. This arrangement is sometimes preferred in the design of household refrigerators because it provides better visibility of the upper shelves and because it is not usually considered necessary to have the tall bottle space extend the full width of the cabinet. The arrangement of FIG. 6 is more compact because the inclined bottom of the drinking water and ice-making tank fits with the angle of repose of ice delivered to the storage compartment 56'. This arrangement also allows removal of the ice-making surface as part of the water tank. It is preferred that the water tank and particularly its inclined bottom be made of quite thin stainless steel whereas the balance of the assembly may be made of cheaper metals.

Since ice is made in the drinking water tank the overflow from the drinking water tank serves to deliver ice to the storage compartment and the pump 20 delivers water directly to the drinking water tank. This necessitates a higher lift of the water since it is desired to have the overflow tank 22' located below the ice storage compartment 56' but this design eliminates the need for a check valve in the water pump discharge line and the need for any special device such as the venturi shown in my U.S. patent application, Serial No. 50,101 previously mentioned.

In order to prevent siphoning of water from the upper tank 34' to the lower tank 22' the discharge tube 140 of the pump 20 is carried over the top edge of the tank 34' and its open end located at least partly above the idle water level 142 of tank 34', this delivery end of the tube being preferably flattened to conserve vertical height and spread water delivery. The angle of the tube 140 at its delivery end is more nearly horizontal than the angle of the tank bottom so that the tank can slide forward on its inclined support without disturbing the tube 140.

To remove the tank 34' it is first necessary to remove the cross member 144 which is preferably attached to the housing by means of screws at its opposite ends. This cross member serves to hold the tank in place and may actually contact the tank at points but the bead at its upper edge is so curved, notched or flattened at points as to allow water condensing on the front of the tank to flow into the gutter formed by this same cross member and be carried thereby to one side of the ice storage compartment where it drips or flows down the side wall into the overflow tank 22'. Defrost moisture from the evaporator 146 also drips into this gutter and is similarly delivered to the overflow tank.

The upper edge of the tank 34' may fit snugly against the top liner 148 of the cabinet. To provide a cushion effect and tight fit a compressible gasket such as 68 may be used. This wedging of the tank between the top of the liner and the contact buttons 12 of the evaporator 146 aids in securing good thermal contact between the tank bottom and these buttons. The tank bottom being made of thin metal and pushed downwardly by the weight of water insures good contact with the various buttons 12 even though they may not be exactly in one plane. The tubing used in construction of the evaporator 146 is preferably ferrous and heavy walled. If non-ferrous tubing of less rigidity is employed it is preferred that additional structure be used to provide rigidity, but ordinarily it is deemed sufficient to support the evaporator 146 at its two ends as indicated by the cross member 150 shown at the lower end.

FIG. 6 illustrates the relationship between bulbs 44 and 138 as described in connection with previous views. The bulb 44 is held against the bottom of tank 34' by means of the spring clip 152 and may be adjusted longitudinally with in this clip. As shown the bulb 44 is near the far side of the bottom of tank 34' and adjusted so that the uppermost button 12 on the far tube of evaporator 146 produces a piece of ice which partly overlaps the bulb 44. At the desired size of this piece of ice the bulb 44 is cooled to the cut-out point of switch 46. At this time the bulb 44 is colder than the bulb 138 and therefore contains all of the liquid portion of the volatile charge of the thermostatic switch 46 and it is only after the adjacent piece of ice 12 has melted free from the surface on which it was formed that the temperature of bulb 44 can rise to the cut-in point of switch 46. However, in the event that ice has accumulated in the space 56' up to the level at which it cools the bulb 138 to the temperature at which switch 46 opens the switch will remain open even though bulb 44 warms up, since all of the volatile charge of the control 46 which is in its liquid phase will now be in the colder bulb 138.

It will be seen that the bulb 138 may be adjusted vertically to vary the ice quantity at which the control 46 is held open. The bulb 138 is preferably located against the metal wall which is contacted by stored ice on its inner side and is exposed to cabinet air on its outer side. This provides a slight modification in the maximum quantity of ice in storage, making the control 46 cut out in response to the accumulation of a smaller ice supply when cabinet air temperature is low and in response to the accumulation of a larger ice supply when cabinet air temperature is higher. This automatically provides more frequent operation of the condensing unit and maintenance of a greater reserve supply of ice when the refrigerator door is opened frequently or kitchen air temperature is high.

The overflow notch 154 in the rear wall of tank 34' is bordered on the bottom and two sides by the outwardly turned edge 156 which guides overflow water and ice into the channel 158. Ice is deflected through the opening 160 into the storage compartment 56' by the grid 162 which is preferably formed of parallel wires and so shaped that drippage therefrom falls into the channel 158. Any water carried through the opening 160 with the ice as well as water of meltage from the ice falls into the overflow tank 22', either flowing down the side walls of compartment 56' or draining from the ice through the perforated shelf 56' or around its edges. This shelf is removably supported as explained in connection with 58 of FIG. 1 to provide access to the float valve 26. The bend or curvature of the wires which form the grid 162 is also useful in modifying the angle of delivery of falling ice as it reaches the compartment 56'. Ice is directed more nearly horizontally so that it can build up to a higher peak thus increasing the capacity of the ice storage chamber.

The door 164 of the ice storage compartment is similar to the one shown in FIG. 1 but is hinged on a pair of pins 166 extending inwardly from the two side walls of the chamber. This hinge axis is located inside of the compartment so that the inwardly extending wings 168 of the door may be of circular contour in the area where contacted by ice. This is more important in FIG. 6 than in FIG. 1 because FIG. 6 does not allow these wings to extend downwardly as shown in FIG. 1. The dotted position 164' of the door in FIG. 6 indicates the position of maximum door opening and the movement of the door front relative to the curved forward end of the shelf 58'. This open position of the door is preferably such that in the event the user closes the main door of the refrigerator while the ice door is open the latter will thereby be closed rather than damaged.

The butter storage compartment 139' may be provided with insulation 172 to whatever extent is required to maintain the temperature of this compartment within the desired limits, such temperature being higher than that of the main food compartment of the refrigerator. This compartment is heated by the electric motor 52 which drives the water pump 20. The shaft connecting the motor with the pump is provided with a seal or stuffing box to prevent flow of water from the overflow tank 22' into the compartment 139', but a drain opening 174 is provided to dispose of what small leakage there may be around the pump shaft. This leakage falls into the drip pan 176 and is conducted thereby to the liner of the cabinet by means of the extension 76 as shown in FIGS. 1, 2 and 3.

Figure 8:
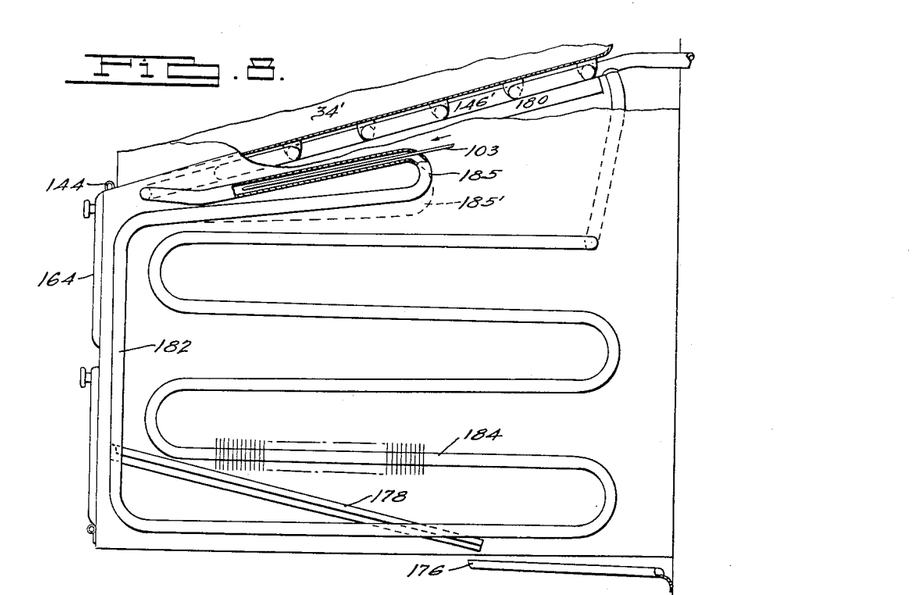
FIG. 8 is a side elevation of FIG. 6 partly in section showing a secondary finned coil for cabinet air cooling.

Since compartment 139' is warmer than the main food space its outer walls will not collect moisture, hence in the arrangement of FIG. 6 it is not necessary that the pan 176 extend forward under the entire assembly as does pan 74 in FIG. 1. Moisture collected on the side walls of this assembly above the level of the compartment 139' can be carried to the pan 176 by means of small channels 178 placed at an angle on these side walls as shown in FIG. 8. Condensation on the front of the tank 34' is led inside as previously explained and likewise condensation on the front of the door 164 is led inside by the curvature at the lower edge of the door front shown in FIG. 6.

FIG. 8 shows a secondary evaporator coil which is preferably located between the low side assembly just described and the adjacent side of the liner of the food compartment. This view is looking at the assembly of FIG. 6 from the same angle but shows the evaporator 146' with the coil looped crosswise instead of lengthwise thereby calling for a supporting member 180. The crosswise looping of coil 146' is to provide for flow of liquid downwardly in all loops when the evaporator is idle. This liquid accumulates to a level at which it overflows into the vertical tube 182 thereby feeding liquid to the finned secondary evaporator coil 184. Vapor flows from the upper leg of this coil to the upper leg of coil 146' and condense therein during idle periods of the compressor. This provides additional box air cooling while the compressor is idle and the consequent heating of coil 146' expedites the release of ice previously formed on the bottom of the tank 34'.

The restrictor tube 103 preferably enters the low portion of the coil 146' and is so directed as to induce refrigerant flow upwardly through the coil 146' rather than downwardly in the tube 182. The arrangement of this jet effect and the height of the loop 185 at the top of the tube 182 can be designed or adjusted as indicated at 185' to obtain the desired division of cooling effects between the coil 146' and the coil 184 during operation of the compressor.

Figures 9, 10:
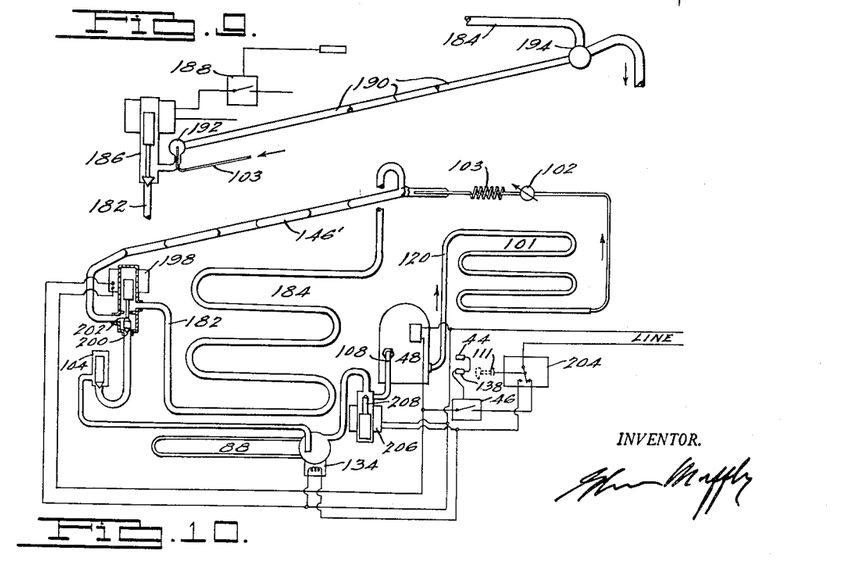
FIG. 9 is a modification of FIG. 8 showing a solenoid valve arranged to control the finned secondary evaporator.
FIG. 10 is a diagram of the refrigerant and electrical circuits showing further modifications.

If desired to eliminate cooling of the coil 148 during operation of the compressor a solenoid valve 186 may be employed at this point as indicated by FIG. 9. The solenoid of this valve is energized when the compressor is idle or through a thermostatic switch 188 which closes in response to a rise of air temperature in the main food storage space of the refrigerator. FIG. 9 illustrates a further modification of the ice-maker evaporator. The parallel tubes 190 connect the liquid header 192 with the suction header 194. The secondary evaporator 184 in this case extends above header 194 to prevent any liquid entering it from the header.

When the release of ice is aided by the secondary evaporator 184 as shown in FIGS. 8 and 9 the upper pieces of ice may be released before those in the deeper portion of the tank 34' because of vapor flow from evaporator 184 affecting the upper portion of the ice-making evaporator first. For this reason it may be found advisable to locate the bulb 44 adjacent one of the buttons 12 at the deeper end of the tank. This bulb location will be determined from the actual tests of each design but is shown near the rear shallow end of the tank in FIG. 6 because the water in tank 34' is apt to be within the temperature range of reverse thermal expansion, which means that the warmer water will collect in the deeper portion of the tank when the water pump is idle, thus expediting the release of ice from the tank bottom in this deeper portion.

FIG. 10 shows a dual valve actuated by solenoid 198 to control the secondary evaporator 184 and flow of liquid refrigerant to the weighted check valve 104 which feeds the freezer evaporator. The solenoid 198 is connected in parallel with the motor-compressor unit 48 so that when the compressor operates, due to closing of switch 46, the valve 200 is opened and the valve 202 is closed so that refrigerant liquid and vapor flow from the active ice-maker evaporator 146' to the valve 104 and thence to the freezer evaporator 88. The closing of the valve 202 stops flow of liquid refrigerant to the evaporator 184 so that only the ice-maker evaporator and the freezer evaporator are active.

When the defrost switch 204 is actuated by pulling the knob 111 outwardly, the compressor is stopped and the solenoid 198 is deenergized thus opening the valve 202 and closing the valve 200. In addition the operation of the switch 204 energizes the electric heating element 134 and the solenoid 206, the latter causing the valve 208 to close and stop flow of refrigerant vapor from the freezer evaporator 88 to the motor-compressor unit 48. It will be seen that this traps whatever refrigerant liquid and vapor there may be in the freezer evaporator. Refrigerant cannot flow backwardly past the weighted check valve 104 and can only flow past the valve 208 in the suction line 108 if the pressure developed within the freezer evaporator 88 is great enough to unseat the valve 208 against the force exerted by the solenoid 206. Knowing the characteristics of the solenoid and the vapor pressure curve of the refrigerant the required area of valve port closed by the valve 208 can be calculated to provide any desired pressure at which this valve permits the relief of pressure from the freezer evaporator to the motor-compressor unit.

Whenever the compressor stops the solenoid 198 is deenergized thus causing the ice-maker evaporator to function as a condenser and the evaporator 184 to become active in cooling air within the cabinet. This continues so long as the compressor is idle, whether the compressor motor circuit has been broken by the thermostatic opening of switch 46 or by the manual operation of switch 204. While the ice-maker evaporator is defrosting, whatever liquid and vapor were in it when it stopped its ice-freezing period will remain to circulate downwardly in the tube 182 as liquid and upwardly through the evaporator 184 to the upper portion of the ice-maker evaporator 146' as vapor, this vapor condensing in the ice-maker evaporator to defrost it and the resulting liquid flowing again into the tube 182. Loss of refrigerant from this secondary refrigerant circuit is prevented by the fact that the valve 200 is closed and by the check valve 102 in the liquid supply line. This operation occurs at the end of each ice-freezing period under control of the thermostatic switch 46. Such defrosting of the ice-maker evaporator may occur hourly whereas the defrosting of the freezer evaporator may occur weekly and requires only a few minutes.

When the switch 204 is operated to defrost the freezer evaporator it simultaneously causes a short defrost period to occur in the ice-maker evaporator 146' if it is not already in the defrost portion of its cycle. When the switch 204 snaps back to its normal position at the end of the defrosting of the freezer evaporator under thermal or time control, as explained in connection with switch 114 of FIG. 4, the ice-maker evaporator goes back under control of the thermostatic switch 46. The time required for defrosting the freezer evaporator will normally be less than the time required for releasing ice from the bottom of the tank 34' or wall 14 of tank 16, hence in the event that the freezer is defrosted in the middle of an ice-making period the pieces of ice partly formed will ordinarily remain attached to the tank and continue their growth as soon as the defrosting of the freezer is completed. In case the thermostatic switch 46 closes while the freezer is being defrosted, the compressor will not start nor the solenoid 198 be energized to start an ice-making period until the defrosting of the freezer is completed.

The system as previously described may be modified in many ways without departing from the spirit of the invention. For example, in FIG. 11 I have illustrated a system adapted for operation by means of an absorption machine of the three-fluid type in which an inert gas is used to provide a low partial pressure in the evaporator or evaporators while the absence or reduced percentage of inert gas in the condenser allows the higher partial pressure required to condense the vapor of the refrigerant. Systems of this type have been designed to provide various evaporating partial pressures and thereby various temperatures in different evaporators or sections of the same evaporator. This multitemperature type of three-fluid absorption system is chosen as the example for FIG. 11. A system operated in this manner is illustrated and described in U.S. Patent No. 2,314,064, issued March 16, 1943, on application of Carl T. Ashby and this patent may be referred to for details of the absorption system which is briefly described below.

Figure 11:
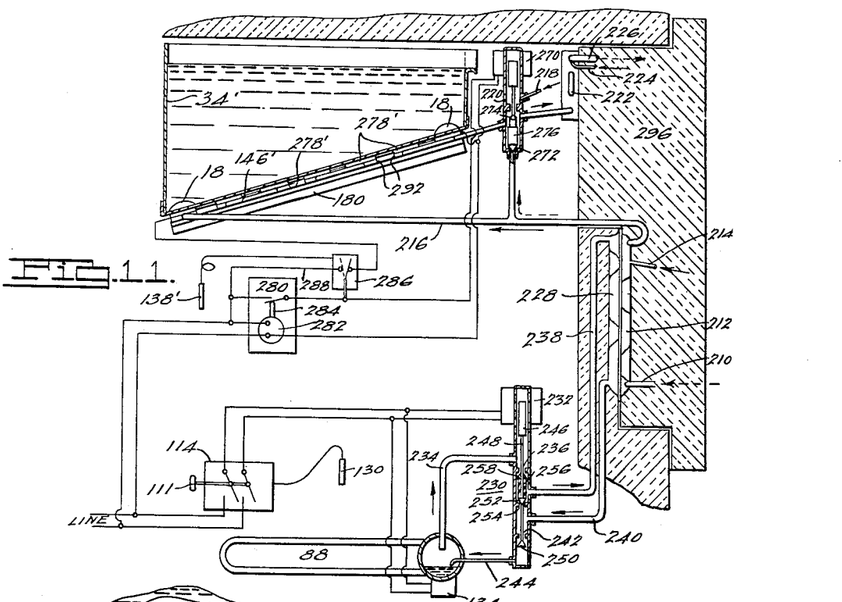
FIG. 11 is a diagrammatic illustration of the system showing refrigerant circuits adapted for a three-fluid absorption system.

In FIG. 11 the dotted arrow at 210 indicates flow of inert gas to the evaporator 212 where this gas meets liquid refrigerant introduced at 214. Due to the preponderance of the inert gas the liquid introduced at 214 evaporates under a very low partial pressure thus cooling the evaporator 212 to a very low temperature. The inert gas, enriched by the refrigerant vapor, now flows through the tube 216 to the evaporator 146' which may be identical with the evaporator of FIG. 6 or FIG. 8 identified as 146 or 146' respectively. This is the medium temperature evaporator in which liquid refrigerant introduced at 218 evaporates and its vapor mingles with the mixture supplied through tube 216 thus further enriching the inert gas with refrigerant vapor and raising the partial pressure under which the refrigerant evaporates. The mixture of gases leaving evaporator 146' flows through the valve assembly 220 which is open to allow flow of this mixture into the evaporator 222 where it meets an additional supply of liquid refrigerant introduced through the tube 224. This evaporator operates at a still higher temperature because of the higher partial pressure under which the refrigerant is now required to evaporate. The mixture leaves evaporator 222 through the tube 226, flowing to the absorber (not shown) from which inert gas returns to the inlet 210 while the refrigerant vapor, now absorbed, is released in a generator (not shown) from which it flows to a condenser or condensers to be liquefied and the liquid refrigerant is returned to the inlets 214, 218 and 224.

Since this type of absorption system normally calls for the absorber and generator being located below the lowest evaporator it may be preferred to cool the freezer evaporator 88 by means of a secondary system. Such a secondary system is here shown including the evaporator 88, the condenser 228, their connecting tubes and the valve mechanism 230. This valve mechanism is shown in its normal position which it occupies all of the time except when the evaporator 88 is being defrosted. This is the valve position which prevails when the solenoid 232 is not energized. Refrigerant vapor leaving the evaporator 88 flows through the tube 234, through the open valve port 236 and through the tube 238 to the top of the condenser 228 where the vapor is condensed by virtue of the cooling effect of the coldest evaporator 212 of the primary system. The liquid thus formed flows through the tube 240 to the valve assembly 230 where it passes through the open valve port 242 and through the tube 244 to the evaporator 88 thus completing the circuit of the secondary system.

When the freezer evaporator 88 is defrosted by means of the electric heating element 134, as previously described in connection with compression-type systems, the solenoid 232 is energized for the purpose of isolating the freezer evaporator 88. This causes the armature 246 to lift, carrying with it the rod 248 and the three valves mounted thereon. The valve 250, being firmly fixed on the rod, closes the port 242. The rod 248 also lifts the valve 252 from its seat on the dividing wall 254. This also lifts the compressible sleeve 256 which in turn lifts the upper valve member 258 to close the port 236. The compressible member 256 seals the stem 248 to the valve 258 and allows pressure relief from evaporator 88 during its defrosting period.

The length of the sleeve or spring member 256 is such that the valve 258 contacts its seat before valve 250 contacts its seat. Since the solenoid armature 246 is provided with more travel than necessary to close the valve 250 this insures that both valves will be closed when the solenoid 232 is energized. The electrical heater 134 is connected in parallel with the solenoid 232 and operated by means of a switch 114 as described in connection with FIG. 4 where the corresponding solenoid 112 operates a different type of valve mechanism adapted to serve a compression-type system.

Referring now to the valve mechanism 220 shown in the upper portion of FIG. 11, it will be seen that the energizing of solenoid 270 will unseat the valve 272 and seat the valve 274. The latter stops the flow of liquid refrigerant from the inlet 218 to the evaporator 146' while the lifting of valve 272 allows the refrigerant vapor and inert gas mixture to by-pass the evaporator 146' flowing directly from the evaporator 212 to the evaporator 222. Some of this gaseous mixture may continue to flow through the evaporator 146' but is greatly restricted by the body 276 which carries the valves 272 and 274. While this is a free fit within the tubular body of 220 it covers the outlet of evaporator 146' to the interior of 220 and the lifting of the valve 272 opens a freer flow path for the gaseous mixture.

It will be seen that the solenoid 270 is connected in parallel with the heating elements 278 (or element 278'). The latter is located in contact with the evaporator 146' between it and its support 180 while the former contacts the bottom of tank 34' directly. The switch 280 is closed by the clock 282 acting through the insulated plunger 284 at regular intervals for a short period of, say 2 minutes, with, for example, 28 minutes of open time between. The longer period, during which the switch is open, is the one during which the evaporator 146' is refrigerated and ice discs 18 are formed in the tank 34'. During the shorter period when heat is applied by means of the elements 278 or element 278' refrigeration of evaporator 146' is stopped by the actuation of valve mechanism 220. This cyclic operation continues until enough ice has accumulated in the storage chamber 56' (FIG. 6) to cool the bulb 138' which is located in the same manner as the bulb 138 of FIG. 6. The cooling of this bulb by its contact with stored ice causes the switch 286 to move, breaking the circuit of the heating elements 278 or element 278' and closing the circuit through the conductor 288 to energize the solenoid 270 regardless of whether or not the clock-operated switch 280 is closed.

Figures 12, 13:
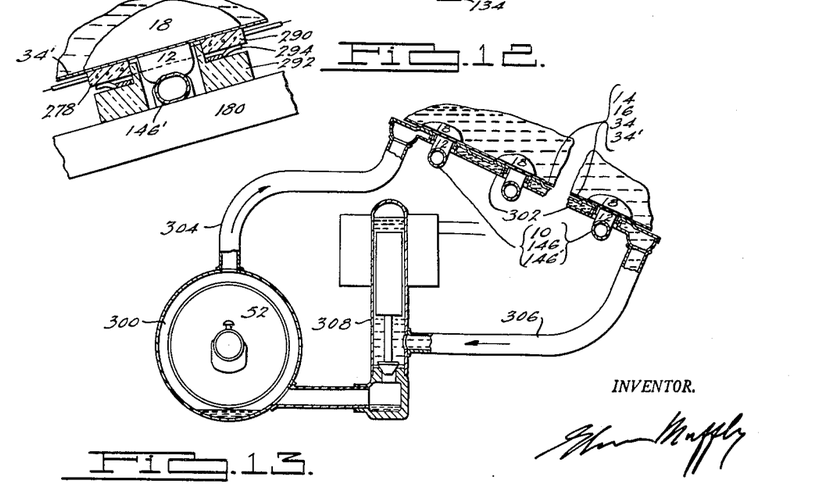
FIG. 12 is an enlarged detail of FIG. 11 showing one of the electric heating elements for releasing ice.
FIG. 13 is an optional heat transfer device.

The elements 278 provide more direct application of electrical heat to the surfaces upon which ice has been formed than does element 278', thus releasing the ice in less time and with less heat input to the refrigerator cabinet. FIG. 12 shows an enlarged detail of one of the contact buttons 12, a heating element 278 and a portion of the bottom of the tank 34' with an ice disc 18 attached. The contact button 12 is surrounded by the circular heating element 278 which includes electrically insulated resistance wires 290 and preferably is thermally insulated from all contacts except that with the bottom of the tank 34', being held firmly against the tank bottom by a ring 292 and the spring washer 294. There is one of these circular heating elements surrounding each of the buttons 12 and they are connected in suitable series or series and parallel manner to match the available voltage of current and insure safety. By applying the heat directly to the tank bottom rather than through the evaporator tube and the contact buttons it is possible to shorten the ice releasing period materially and improve the efficiency of the system. The optional plate-type heating element 278' is omitted in FIG. 12, as it is not intended that both types of heating elements be used.

Some types of absorption systems are not necessarily limited to the elevated location of evaporators, in which case the freezer in the lower section of the cabinet may be cooled by a primary evaporator, as shown herein for the compression type of system.

Other two zone absorption systems have the colder evaporator located at a higher level than the warmer evaporator, as in A. D. Siedle's U.S. Patent No. 2,310,875. Such an arrangement would allow evaporator 212 of FIG. 11 to be located within the upper part of the removable wall section 296 of the refrigerator or the location of this evaporator in a freezer compartment located above the ice maker. This specification and the accompanying drawings are designed to disclose means usable in various combinations with various types of refrigerating systems, such combinations being obvious to one skilled in the art after study of the various disclosures herein.

Since the water pump motor will normally release more waste heat than is required in the butter compartment and this waste heat would be useful in expediting the release of ice, I have shown in FIG. 13 a heat transfer circuit for effecting this economy. The motor 52 which drives the water pump may be equipped with a jacket 300 connected with the heating element 302 which is designed to contact the wall of the tank in which ice is made. This heating element is connected with the jacket 300 by means of the riser tube 304 and the return tube 306, one of these tubes being provided with a solenoid-actuated control valve 308. The heating element 302 contacts the angular bottom of the ice-making tank, as shown in FIGS. 6 to 12 inclusive, or the vertical side of a wall, as shown in FIGS. 1 to 5 inclusive, on a small annular area surrounding each of the contact buttons 12 and is provided with round holes to accommodate these buttons.

As shown in FIG. 13 a volatile liquid such as an evaporative refrigerant is employed. In this case it is preferred that the internal volume of the heating element 302 be made large enough to hold substantially all of the volatile charge in its liquid phase, thus during an ice-making period most of the liquid will be contained within the heating element 302 while the jacket 300 contains only vapor of this same liquid. At the end of the ice freezing period when valve 308 opens, this liquid will flow into the jacket 300 and evaporate to carry the heat accumulated by the motor and by the material forming the jacket upwardly through the tube 304 as latent heat of vaporization. The vapor will condense within the heating element 302 giving up its heat to the wall of the tank directly opposite the ice-making areas. As in the case of FIGS. 11 and 12, the heat is applied to the tank wall which is preferably made of thin metal such as stainless steel having a low thermal conductivity, hence the heat is localized where it is most effective in releasing the ice.

When a low volatility liquid, such as water, alcohol or brine, is used the jacket 300 preferably has a larger internal volume, of which a portion is located at a higher level than the inlet to tube 304 to serve as a vapor trap and provide expansion space for the liquid. Except for this expansion space or dome the circuit is filled with liquid which circulates upwardly through tube 304 and downwardly through tube 306 whenever the valve 308 is open. When valve 308 is closed there will be no circulation and the liquid contained in the jacket 300 will rise in temperature. Upon opening of the valve 308, which may be controlled as is the valve 188 of FIG. 9, the cold liquid contained within the heating element 302 will flow downwardly through the tube 306, displacing the hot liquid in jacket 300 which flows upwardly from the jacket 300 through the tube 304 to the heating element 302, thus delivering previously stored heat to the ice-maker tank wall immediately opposite the surfaces on which ice has been formed.

The choice between electrical heating, liquid circulation and latent heat transfer in an evaporative system will be determined by balancing production costs against operation costs.

An optional detail of FIG. 11 is to omit the liquid inlet 224 so that evaporator 222 serves only as a dryer coil during operation of evaporator 146'. In this case the liquid inlet 218 would be connected below the seat of valve 274 so as to feed either evaporator 146' during the ice-making period or evaporator 222 during the ice-releasing period. The result is that evaporator 222 becomes active when evaporator 146' is bypassed by energizing of solenoid 270. In absorption systems of the uniform gage pressure type the valve assembly 220 may be replaced by a liquid trap device which blocks flow of refrigerant through the ice-making evaporator 146' during its defrosting (ice-releasing) periods.

Such devices for bypassing a section of the system are known in the art and need not be illustrated here. They are operated by tilting a section of the tubing or by otherwise displacing a small volume of liquid trapped in the system. The result is to periodically stop cooling of the evaporator 146' and at the same time start or increase the evaporation of refrigerant in the evaporator 222. The solenoid 270 may be connected to operate such a liquid-displacing or tube-tilting device instead of the valve and thus accomplish the same result with no moving part inside of the refrigerant circuit.

Another optional feature is that the timing device 129 of switch 114 or 136 may be energized (wound up) by normal opening of the freezer drawer as well as by pulling out the knob 111. When energized by opening of the drawer alone the defrosting circuit is not closed, hence the effect is merely to cause the drawer to reclose automatically at the end of a predetermined time. When the knob 111 is pulled out some time after the opening of the drawer and to the end of its full travel this closes the defrosting switch 114 or 136 and rewinds the clock mechanism to provide the required defrosting period before the reclosing of the drawer. The partial outward movement of knob 111 which energizes the clock mechanism to time the reclosing of the drawer, with or without stopping the compressor, but without closing the defrost switch, may be accomplished by mounting the striker 310 on the near side of drawer 110 as shown in FIG. 5. The final outward movement of the drawer thus energizes the clock mechanism. When knob 111 moves back it starts the gravity reclosing of drawer 110 and restarts the compressor. In case it is not desired to open the compressor motor circuit each time the drawer is opened, some lost motion is provided between the timing device 129 energized by knob 111 and the switch, as shown by collars 312 which engage the switches after some outward movement of knob 111.

Figure 2:
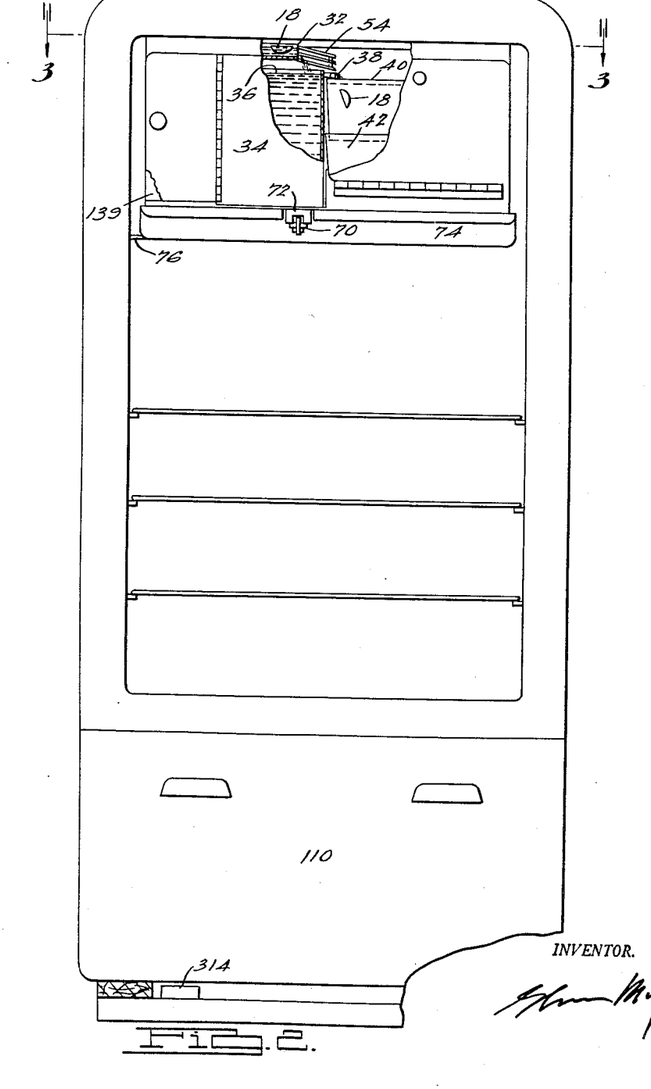
FIG. 2 is a front elevation of FIG. 1, omitting the front door of the cabinet.

Another optional arrangement is to provide means such as 314 of FIGS. 1 and 2 which includes a motor and gear reduction driving a drum or spool on which the tape 316 is wound up to pull the drawer open, the tape being attached to the rear of the drawer, as at 318. This motor is energized periodically through a clock-driven switch or a switch which closes in response to a given number of movements of the drawer to wind up the tape 316 and thus pull the freezer drawer open. Such switches are well known both in the clock-driven variety and in the ratchet-actuated type and have been used for the purpose of defrosting the evaporators of refrigerating systems after a given lapse of time or after a given number of movements of a refrigerator door. I employ such a switch, not only to initiate the defrosting operation, but to energize the motor of 314 and thus cause the tape 316 to open the drawer.

In case the switch is clock-operated the clock mechanism is preferably enclosed within the casing of 314. If the switch is actuated by a ratchet device to operate after a given number of drawer movements this ratchet device may be moved a step at a time by the part 318 engaging the push rod 320 each time the drawer is opened. Alternatively the rewinding of the tape 316 by a spring each time the drawer is opened, as an ordinary steel tape line of the pocket variety is rewound when one presses the button on the tape case, may actuate the ratchet mechanism one notch for each opening of the drawer. In either case the drawer is mechanically opened and the defrosting switch (such as 114 or 136) is closed by the power-actuated winding up of the tape 316. At the end of the defrosting period the drawer is reclosed, the defrosting switch opened and the refrigeration of the freezer evaporator restarted, as explained in connection with FIGS. 4 and 5 hereof and in my copending U.S. application Serial No. 74,528, filed February 4, 1949, previously mentioned.

In FIG. 6 the rail 144 may optionally be arranged to tilt on a horizontal axis like the door 164 below it. A suitable catch will hold it in the position shown but when the door 164 is opened the rail 144 may be released to tilt and allow the tank 34' to slide out forwardly on the buttons 12 which support it.

In FIG. 11 it will be noted that the primary evaporator 212 and the secondary condenser 228 contact each other in a vertical plane between the removable wall section 296 and the fixed rear wall of the cabinet. This allows for removal of the primary system without disturbing the secondary system which remains in the cabinet. It is preferred that the tube 216 be horizontal or inclined upwardly toward the evaporator 146', hence the upper end of the evaporator 212 should be at a lower level than the connection of the tube 216 with evaporator 146'. The opening in the rear wall of the cabinet which is closed by the upper portion of the removable wall section 296 must, of course, be large enough to allow all parts of the primary system to be removed through the opening in the rear wall of the cabinet which is closed by 296.

References herein to "primary" and "secondary" systems, evaporators and condensers are as used generally in the industry. The above paragraph makes this clear by identifying 212 as a primary evaporator and 228 as a secondary condenser in contact with 212, which cools it. A secondary system comprises a secondary evaporator and a secondary condenser in open communication with each other, the secondary condenser being cooled by separate means, such as ice or an evaporator of a primary system, to a temperature below that of the secondary evaporator. No compressor or other pressure imposing element is required in the secondary system itself, as it merely transfers heat from a warmer to a cooler zone.

I claim:

1. In a refrigerator, a space for storage of a product to be cooled, a primary refrigerating system, a secondary refrigerating system including an evaporator arranged to cool said space and a condenser arranged to be cooled by said primary system, heating means arranged to defrost said evaporator, valve means for shutting inlet and outlet of said evaporator off from said secondary condenser, and means for simultaneously actuating said heating means and said valve means.

2. In a refrigerator, an upper compartment for storage of foods within a temperature range above 32° F., an ice maker in said upper compartment, an insulated drawer forming a lower compartment for the storage of foods in a frozen condition, a primary refrigerating system including evaporator means within said upper compartment for cooling it and the ice maker, a second evaporator forming a part of said system and located above the closed position of said drawer to cool the interior of the drawer to a temperautre below 32° F., control means for regulating the operating and idle periods of said second evaporator, the first said evaporator means including a first section for heat transfer to and from said ice maker and a second section for heat transfer to it from the air in said upper compartment, a portion of said first section being at a higher level than a portion of said second section whereby these sections operate as condenser and evaporator respectively to transfer heat from said air to said ice maker to release ice and to cool said air, between ice forming periods of the ice maker, means for heating said second evaporator during occasional of its idle periods to defrost it, and motor means for opening said drawer at the start of each such defrosting period to prevent defrost water from falling into said drawer.

3. In a refrigerator, a compartment for storage of frozen foods, a compartment for storage of non-frozen foods, a refrigerating system employing a volatile refrigerant and including evaporator means forming surfaces which include a first surface for cooling air for the first said compartment, a second surface for cooling air for the second said compartment and a third surface for cooling water to form ice, means for delivering heat to the first said surface to defrost it while dissipating the excess of said heat to ambient air, and heat transfer means arranged to absorb heat from air of the second said compartment by evaporation of said refrigerant during idle periods of said system and deliver it to said third surface by condensation of said refrigerant for the purpose of releasing ice which has been formed by previous cooling of said third surface.

4. In an ice maker adapted to produce and release small pieces of ice, an ice storage compartment, means for moving ice to said compartment after it has been released, a refrigerating system including a cooling element arranged to cool surface areas on which said pieces of ice are formed, a water-moving device for causing water to flow over said areas while they are cooled, a motor connected to drive said device, a thermostatic switch controlling said motor and the cooling of said areas to cause both water flow and cooling to occur during a preselected period, and heat-sensing means for said switch having a portion located in thermal relationship with said storage compartment and a second portion located in thermal relationship with at least one of said areas on which ice is formed, said portions being affected by small temperature changes in a range near the temperature at which ice forms and acting upon said switch to close it in response to a rise of temperature of both of said portions and to open it in response to a reduction of temperature of either of said portions.

5. An ice-making system including means forming a plurality of surface areas on which ice is formed and from which it is released in discrete pieces, a cooling element in thermal association with said areas for cyclically cooling them, a bin for storage of released pieces of ice, an electric motor and means driven thereby for effecting movement of water in contact with said areas at the start of an ice forming period and later in contact with the ice formed on said areas, a switch connected to control a supply of electric current for simultaneous operation of said cooling element and said motor, an actuating device for said switch comprising means forming an expansible chamber which upon expansion closes said switch, a tubular extension of said chamber forming therewith a gas-tight container, means placing one section of said extension in heat exchange with one of said areas and another section thereof in heat exchange with ice in said bin, and a charge of volatile fluid filling said container entirely in its vapor phase except that enough of the vapor may be condensed in either of said sections by a local reduction of temperature to reduce the vapor pressure in said expansible chamber to that at which said switch reopens.

References Cited in the file of this patent

UNITED STATES PATENTS

| | | |
|---|---|---|
| 2,124,268 | Williams | July 19, 1938 |
| 2,172,442 | Grubb | Sept. 12, 1939 |
| 2,317,816 | Scott | Apr. 27, 1943 |
| 2,488,529 | Field | Nov. 22, 1949 |
| 2,493,488 | Jordan | Jan. 3, 1950 |
| 2,577,902 | McGrath | Dec. 11, 1951 |
| 2,595,588 | Lee | May 6, 1952 |
| 2,612,026 | Hansen | Sept. 30, 1952 |
| 2,635,439 | Philipp | Apr. 21, 1953 |
| 2,672,016 | Muffly | Mar. 16, 1954 |
| 2,672,017 | Muffly | Mar. 16, 1954 |
| 2,701,452 | Hopkins | Feb. 8, 1955 |
| 2,709,343 | Muffly | May 31, 1955 |
| 2,775,099 | Brown | Dec. 25, 1956 |
| 2,775,101 | Hanson | Dec. 25, 1956 |
| 2,846,854 | Galin | Aug. 12, 1958 |

FOREIGN PATENTS

| | | |
|---|---|---|
| 490,570 | Canada | Feb. 17, 1953 |